(12) United States Patent
Nakayama et al.

(10) Patent No.: US 7,332,539 B2
(45) Date of Patent: *Feb. 19, 2008

(54) PLASTISOL COMPOSITION

(75) Inventors: Kenta Nakayama, Takatsuki (JP); Hitoshi Ohno, Osaka (JP); Takashi Minamihori, Takatsuki (JP)

(73) Assignees: Sunstar Giken Kabushiki Kaisha, Osaka-fu (JP); Sunstar Suisse SA, Ecublens (CH)

( * ) Notice: Subject to any disclaimer, the term of this patent is extended or adjusted under 35 U.S.C. 154(b) by 507 days.

This patent is subject to a terminal disclaimer.

(21) Appl. No.: 11/029,105

(22) Filed: Jan. 3, 2005

(65) Prior Publication Data

US 2006/0148929 A1    Jul. 6, 2006

Related U.S. Application Data

(63) Continuation-in-part of application No. 10/275,271, filed as application No. PCT/JP00/03123 on May 16, 2000, now abandoned.

(51) Int. Cl.
*C08L 75/04* (2006.01)

(52) U.S. Cl. .............. 524/507; 524/251; 524/252; 524/257; 524/296; 524/297

(58) Field of Classification Search ........ 524/251–252, 524/257, 296–297, 507
See application file for complete search history.

(56) References Cited

U.S. PATENT DOCUMENTS

| 5,155,154 A | 10/1992 | Krummel et al. |
| 5,284,918 A | 2/1994 | Huynh-Tran et al. |
| 5,441,994 A | 8/1995 | Moriga et al. |
| 5,741,824 A | 4/1998 | Butschbacher et al. ....... 521/73 |
| 5,919,857 A | 7/1999 | Ruch et al. .................. 524/555 |
| 6,809,147 B1 * | 10/2004 | Ohno et al. .................. 524/507 |

FOREIGN PATENT DOCUMENTS

| JP | 55-118948 | 9/1980 |
| JP | 59-078279 | 5/1984 |
| JP | 59-120651 | 7/1984 |
| JP | 02-086641 | 3/1990 |
| JP | 09-031412 | 2/1997 |
| JP | 10-168266 | 6/1998 |

* cited by examiner

*Primary Examiner*—Peter Szekely
(74) *Attorney, Agent, or Firm*—Jacobson Holman PLLC

(57) ABSTRACT

The present invention provides a plastisol composition which combines low temperature baking property and storage stability which are comparable to those of the prior polyvinyl chloride plastisols and has a low-temperature flexibility.

The plastisol composition according to the present invention comprises an acrylic plastisol consisting of a plasticizer having acrylic resin particles and a filler dispersed therein and therewith formulated a blocked urethane prepolymer wherein free isocyanate groups of a terminal isocyanate containing urethane prepolymers have been blocked or a blocked polyisocyanate compound and a latent curing agent which is particulate solid at normal temperature, has a melt point of 60° C. or higher, and is insoluble in the plasticizer at 40° C. or lower.

3 Claims, No Drawings

PLASTISOL COMPOSITION

This is a Continuation-In-Part of Ser. No. 10/275,271, filed Nov. 12, 2002, abandoned, which is a 371 of PCT/JP00/03123, filed May 16, 2000, the contents of which are incorporated herein by reference.

TECHNICAL FIELD

The present invention relates to a plastisol composition, and more particularly a plastisol composition which comprises an acrylic plastisol of acrylic resin particles having an polyisocyanate component wherein free isocyanate groups (NCO) have been blocked and a specific latent curing agent, as a thermosetting material, and combines two performances which are comparable to those of the prior polyvinyl chloride plastisol, that is, low temperature baking property and storage stability and has a low-temperature flexibility, and which is useful as, such as, a body sealer and undercoating material in automotive assembly line.

BACKGROUND ART

In the prior art, polyvinyl chloride (PVC) plastisols which comprise a plasticizer having PVC particles dispersed therein and combine low temperature baking property and storage stability and have low-temperature flexibility, have been greatly used as a body sealer in automotive assembly line. However, these PVC plastisols had disadvantages that since the main component is PVC, a generation of hydrogen chloride gas may bring a destruction of ozone layer, a cause of acid rain and a cause of dioxin.

So, it has been strongly wanted that such PVC plastisols are replaced by acrylic plastisols which comprise a plasticizer having acrylic resin particles and a filler dispersed therein. This acrylic plastisol has no problem for coping with both low temperature baking property and storage stability and moreover is excellent in workability and it can be used in any existing facilities, and hence, it is very promising material, but it is bad particularly in low-temperature flexibility and is very expensive.

On the other hand a one-pack type thermosetting polyurethane sealer is currently employed on trial which comprises a curing agent and a blocked urethane prepolymer wherein free NCO groups of a terminal NCO-containing urethane prepolymer obtained by reaction of polyol with an excess amount of polyisocyanate compound have been blocked. Although such a sealer has excellently enhanced physical properties, strength and elongation at cold, it was expensive and bad in workability, and furthermore, it was difficult to cope with both storage stability and low temperature baking property using such a sealer. For example, if low temperature baking property is regarded at as important, a blocking agent of low dissociation temperature in the blocked polyurethane prepolymer will result in reduced storage stability. In contrast, when a blocking agent of high dissociation temperature is used, desirable physical properties can not be developed unless it is heated typically at a temperature of 160° C. or higher, and finally low temperature baking property becomes inferior.

DISCLOSURE OF INVENTION

When the present inventors made intense studies to search for an alternative material having performances which are comparable to those of the prior PVC plastisols, they found that if said acrylic plastisol is formulated with an polyisocyanate component wherein free NCO groups have been blocked and a latent curing agent which is solid at normal temperature and insoluble in a liquid component including the plasticizer in the composition as a thermosetting material, the low temperature baking property and the storage stability are compatible, and the low-temperature flexibility also bears comparison with that of PVC plastisol, and hence, they completed the present invention.

Thus, according to the present invention there is provided a plastisol composition which comprises an acrylic plastisol consisting of a plasticizer having acrylic resin particles and a filler dispersed therein and therewith formulated a blocked urethane prepolymer wherein free NCO groups of a terminal NCO-containing urethane prepolymer have been blocked, or a blocked polyisocyanate compound and a latent curing agent which is particulate solid at normal temperature, has a melt point of 60° C. or higher and is insoluble in the plasticizer at 40° C. or lower.

Examples of acrylic resin particles in the present invention include, for example, a homopolymer or copolymer of alkyl acrylate ester (wherein alkyl is methyl, ethyl, butyl, 2-ethylhexyl, etc.) or alkyl methacrylate ester (wherein alkyl is methyl, ethyl, butyl, lauryl, stearyl, etc.), or another copolymer with other acrylic monomer (e.g., methacrylic acid, acrylic acid etc.) or itaconic acid, and preferably those having a particle diameter of the primary particle and/or the secondary particle (which consists of aggregated primary particle) of 0.1-100 μm.

Examples of filler in the present invention include, for example, clay, calcium carbonate (e.g., heavy-duty calcium carbonate, precipitated calcium carbonate, surface treated calcium carbonate, etc.), magnesium carbonate, titanium oxide, calcined plaster, barium sulfate, zinc white, silicic acid, mica powder, talc, bentonite, silica, glass powder, red iron oxide, carbon black, graphite powder, alumina, silas balloon, glass balloon, plastic balloon, ceramic balloon, metal powder, and the like.

Examples of plasticizer in the present invention include, for example, phthalate ester such as di-2-ethylhexyl phthalate, butyl benzyl phthalate, dinonyl phthalate, diisononyl phthalate, diisodecyl phthalate, diundecyl phthalate, diheptyl phthalate, butyl phthalyl butyl glycolate; aliphatic dibasic acid ester such as dioctyl adipate, didecyl adipate, dioctyl sebacate; polyglycol benzoate such as polyoxyethylene glycol dibenzoate, polyoxypropylene glycol dibenzoate; trimellitate; pyromellitic acid ester; phosphates such as tributyl phosphate, tricresyl phosphate; hydrocarbons such as alkyl-substituted diphenyl, alkyl-substituted terphenyl, partially hydrogenated alkyl terphenyl, aromatic process oil, pine oil, and the like.

Examples of blocked urethane prepolymer in the present invention can be prepared according to the following procedure:

i) First, polyol is allowed to react with an excess amount of polyisocyanate compound to obtain terminal NCO-containing urethane prepolymer.

Examples of said polyol include, for example, polyether polyol including polyoxyalkylene polyol (PPG), modified polyether polyol, polytetramethylene ether glycol; polyester polyol including condensation polyester polyol, lactone polyester polyol, polycarbonate diol; polybutadiene polyol; polyolefin polyol; and the like.

Examples of said polyisocyanate compound include trimethylene diisocyanate, tetramethylene diisocyanate, hexamethylene diisocyanate, pentamethylene diisocyanate, 2,4, 4- or 2,2,4-trimethyl hexamethylene diisocyanate, dodecamethylene diisocyanate, 1,3-cyclopentane diisocyanate, 1,6-hexane diisocyanate (HDI), 1,4-cyclohexane diisocyanate, 1,3-cyclohexane diisocyanate, 4,4'-methylene bis (cyclohexyl isocyanate), 4,4'-methylene bis(cyclohexyl isocyanate), methyl 2,4-cyclohexane diisocyanate, methyl 2,6-cyclohexane diisocyanate, 1,4-bis(isocyanate methyl) cyclohexane, 1,3-bis (isocyanate methyl) cyclohexane, m-phenylene diisocyanate, p-phenylene diisocyanate, 4,4'-diphenyl diisocyanate, 1,5-naphthalene diisocyanate, 4,4'-diphenyl methane diisocyanate (MDI), crude MDI, 2,4- or 2,6-tolylene diisocyanate, 4,4'-toluidine diisocyanate, dianidine diisocyanate, 4,4'-diphenyl ether diisocyanate, 1,3- or 1,4-xylylene diisocyanate, ω,ω'-diisocyanate-1,4-diethylbenzene, etc.

ii) Next, the terminal NCO-containing urethane prepolymer is allowed to react with a suitable blocking agent (typically at of 0.9-1.5 equivalent of the blocking agent to NCO of the former) for blocking free NCO groups, thereby obtaining an objective blocked urethane prepolymer. Examples of said blocking agent include, for example, alcohol such as methanol, ethanol, propanol, butanol, isobutanol; phenols such as phenol, cresol, xylenol, p-nitrophenol, alkylphenol; active methylene compounds such as methyl malonate, dimethyl malonate, diethyl malonate, ethyl acetoacetate, methyl acetoacetate, acetylacetone; acid amides such as acetamide, acrylamide, acetanilide; acid imide such as succinic acid imide, maleic acid imide; imidazoles such as 2-ethyl imidazole, 2-ethyl-4-methyl imidazole; lactams such as 2-pyrrolidone, ε-caprolactam; oximes of ketone or aldehyde such as acetoxime, methyl ethyl ketoxime, cyclohexanone oxime, acetaldoxime; and others: ethyleneimine, bisulfite, etc.

A blocked polyisocyanate compound which may be used as polyisocyanate component in place of the above-described blocked urethane prepolymer in the present invention, can be obtained by blocking the free NCO groups in the polyisocyanate compound exemplified in the preparation of said terminal NCO-containing urethane prepolymer with said blocking agent.

The above-described acrylic resin particles and the blocked urethane prepolymer or blocked polyisocyanate compound (polyisocyanate component) may be typically used at a weight ratio of 20/1-1/20, and preferably 15/1-1/2. A smaller amount than the lower limit of the latter, polyisocyanate component may result in degraded low-temperature flexibility and reduced adhesion to an adherend, while a larger amount than the upper limit may result in degraded low temperature baking property and remarkably reduced workability.

A latent curing agent which may be used in the present invention is particulate solid at normal temperature, has a melt point of 60° C. or higher, and preferably 60-200° C., and is insoluble in the plasticizer to be used at 40° C. or lower. Those which can be dissolved and activated in the plasticizer under heating of the melt point or higher are preferable. It should be noted that a melt point under 60° C. will degrade the storage stability, which is not practical.

Examples of such a latent curing agent include the following (A) and (B):

(A) Polyamine modified compound (hereinafter designated as "latent curing agent (A)" or "Type (A)"), including:
reaction products of the following (a)-(c): (a) aliphatic polyamine (such as dimethylamino propylamine, diethylamino propylamine, dipropylamino propylamine, dibutylamino propylamine, dimethylamino ethylamine, diethylamino ethylamine, dipropylamino ethylamine, dibutylamino ethylamine, trimethyl hexamethylenediamine, diaminopropane, etc.); (b) a cyclic amine or aromatic polyamine which has at least one $NH_2$ or NH group (for example, polyamines and monoamines such as methaxylylenediamine, 1,3-bis (aminomethyl) cyclohexane, isophorone diamine, menthane diamine, diaminocyclohexane, phenylenediamine, toluylene diamine, xylylenediamine, diamino diphenylmethane, diamino diphenyl sulfone, piperazine, N-aminoethyl piperazine, benzylamine, cyclohexylamine, etc.); and (c) diisocyanate compound (such as isophorone diisocyanate, methaxylylene diisocyanate, 1,3-bis (isocyanate methyl) cyclohexane, 2,4-toluylene diisocyanate, 2,6-toluylene diisocyanate, 1,5-naphthylene diisocyanate 1,4-phenylene diisocyanate, diphenylmethane-4,4'-diisocyanate, 2,2'-dimethyl diphenylmethane-4,4'-diisocyanate, hexamethylene diisocyanate, trimethyl hexamethylenediisocyanate, etc.) [wherein (a)=1 mole; (b)=0.02-3 moles; and ($NH_2$ and/or NH contained in (a) and (b))/(NCO contained in (c)) is equal to 1/1-1.2; and reaction may be performed in a solvent such as aromatic hydrocarbon, alcohol or ketone at from room temperature to 160° C.]; and reaction products of said aliphatic polyamine (a), said amine (b) and epoxide compound (d) which includes glycidyl ether obtained by reaction of epichlorohydrin with polyhydric phenol (e.g., bisphenol A, bisphenol F, bisphenol S, hexahydrobisphenol A, catechol, resorcin, trihydroxybiphenyl, benzophenone, hydroquinone or tetramethylbisphenol A); polyglycidyl ether obtained by reaction of epichlorohydrin with aliphatic polyhydric alcohol (e.g., glycerin, neopentylglycol, ethylene glycol or polyethylene glycol); glycidyl ether ester obtained by reaction of epichlorohydrin with hydroxy carboxylic acid (e.g., p-oxy benzoic acid or oxynaphthoic acid); polyglycidyl ester derived from polycarboxylic acid such as phthalic acid, isophthalic acid, tetrahydrophthalic acid, endomethylene tetrahydrophthalic acid, trimellitic acid, polymerized fatty acid; glycidyl amino glycidyl ether derived from amino phenol or amino alkyl phenol; glycidyl amino glycidyl ester derived from aminobenzoic acid; glycidyl amine derived from aniline, toluidine, tribromoaniline, xylylene diamine or 4,4'-diamino diphenylmethane; and monoepoxide such as epoxidized polyolefin, glycidyl hydantoin, glycidyl alkyl hydantoin, triglycidyl cyanurate, butyl glycidyl ether, phenyl glycidyl ether, alkyl phenyl glycidyl ether, glycidyl benzoate ester, styrene oxide [wherein, propotion of each reaction component is selected as; (a)=1 mole; (b)=0.5-5 moles; ($NH_2$ and/or NH contained in (a) and (b))/(epoxy group contained in (d)) is equal to 1/0.3-0.9, and ($NH_2$ and/or NH contained in (a) and (b))/(NCO contained in (c)) is equal to 1/0.15-1.35; first, portion or all of (b) and (d) are subjected to addition reaction optionally in the above-described solvent at 60-120° C., and then (a), the reminder of (b), and (c) are added to react in the solvent at from room temperature to 160° C.]; and (B) Other polyamine modified compounds (hereinafter designated as "latent curing agent (B)" or "Type (B)"), including:

those obtained by allowing an addition product of an epoxy compound (e.g., bisphenol epoxy resin, novolac epoxy resin, polyester epoxy resin or polyether epoxy resin having one or more epoxy groups in the molecule) with one or more selected from the group consisting of the above-described aliphatic polyamines, cyclic amines and aromatic polyamines to react with a phenol compound (e.g., phenol resin or resole novolac resin) and/or a polycarboxylic acid compound (e.g., adipic acid, sebacic acid, dodecanoic acid or azelaic acid) to mask the amino group to inactivation [typically, 0.7-1.5 equivalent of epoxy group in the epoxy compound is used to one equivalent of amino group in the polyamine for addition reaction, the resultant addition product (1 part by weight) is allowed to react with a phenol compound or polycarboxylic acid compound (0.04-0.5 part by weight) to mask the active amino group; the resultant reaction product is inactive at a temperature under 60° C. and will be activated at a temperature higher than 60° C., particularly 80° C. or higher].

Such a latent curing agent may be typically used at an amount of 1 to 50 parts by weight, and preferably 10 to 30 parts by weight to 100 parts by weight of the above-described blocked polyisocyanate component. Less than 1 part by weight of latent curing agent will not provide a sufficient strength after heat-curing, while more than 50 parts by weight of latent curing agent may cause yellowing or tend to inhibit the curing of top coating paints.

Such latent curing agent may comprise at least one of latent curing agents (A) and (B). That is, such latent curing agent may comprise plural kinds of latent curing agents, such as plural kinds of Type (A) agents, and plural kinds of Type (B) agents, or a combination of one or more Type (A) agents and one or more Type (B) agents.

The plastisol composition according to the present invention may consist of a batch mixture system comprising the above-described acrylic resin, a filler, a plasticizer, blocked isocyanate component and latent curing agent. Optionally, a dehydrating agent (e.g., calcium oxide or molecular sieves), thixotropic agent (e.g., organic bentonite, fumed silica, aluminum stearate, metal soaps or castor oil derivatives), a stabilizer [2,6-di-t-butyl-4-methylphenol, 2,2-methylene-bis (4-methyl-6-t-butylphenol) or dibutyldithiocarbamate nickel], a catalyst (e.g., dibutyltin dilaurate, lead octylate or bismuth octylate), a solvent in which the latent curing agent will not dissolve (high boiling hydrocarbon solvent), and/or an epoxy resin may be suitably selected and added.

BEST MODES FOR CARRYING OUT THE INVENTION

Hereinafter, the present invention will be described in more detail in reference to the following Examples and Comparative Examples.

EXAMPLES 1-3 AND COMPARATIVE EXAMPLES 1-6

(1) Preparation of Blocked Urethane Prepolymer

One hundred parts of polyether polyol ("EL-5030", molecular weight=5000, functionality=3; available from Asahi Glass Co., Ltd.) is allowed to react with 16.4 parts of MDI (NCO/OH=2.2) at 80° C. for 5 hours to obtain terminal NCO-containing urethane prepolymer, followed by reaction with 6.5 parts of methyl ethyl ketoxime at 50° C. for 5 hours in the presence of 0.008 part of dibutyltin dilaurate until elimination of NCO is confirmed by IR. Then, a blocked urethane prepolymer is obtained.

(2) Preparation of Body Sealer

A body sealer is obtained by mixing the components listed in Table 1 under reduced pressure.

(3) Performance Test (Results Are Also Shown In Table 1)

i) Storage Stability

Immediately after preparation of the body sealer, a BH-type viscometer (No.7 rotor, 20 rpm) may be used to determine the viscosity at a material temperature of 20° C. at 1 minute after start of rotation, and then after 3-day, 7-day or 14-day storage at 40° C. under the same conditions. The viscosity change rate (%) is calculated and estimated.

ii) Low Temperature Baking Property

The body sealer is applied (thickness: 3 mm) onto a substrate and cured by heating at 100° C. for 10 minutes. Degree of cure to the touch is checked:
◯: Sufficiently cured, with no tack.
X : Not completely cured, with tack.

iii) Low-Temperature Flexibility

The cured membrane (thickness=3 mm) is bent at −30° C. and flexibility is checked by visual inspection. ◯: No crack, X: crack.

TABLE 1

|  | Examples | | | Comparative Examples | | | | | |
|---|---|---|---|---|---|---|---|---|---|
|  | 1 | 2 | 3 | 1 | 2 | 3 | 4 | 5 | 6 |
| Acrylic resin particle (*1) | 10 | 10 | 10 | — | 20 | — | — | — | — |
| PVC particle (*2) | — | — | — | 20 | — | — | — | — | — |
| Calcium carbonate | 53 | 53 | 53 | 49 | 49 | 52.5 | 53 | 52.5 | 52.5 |
| Diisononyl phthalate | 25 | 25 | 25 | 30 | 30 | 25 | 25 | 25 | 25 |
| Blocked urethane prepolymer of (1) | 10 | 10 | 10 | — | — | 20 | 20 | 20 | 20 |
| Latent curing agent (*3) | 1 | — | 0.5 | — | — | — | — | — | 1.5 |
| Latent curing agent (*4) | — | 1 | 0.5 | — | — | — | — | — | — |
| Polyoxy propylene amine (*5) | — | — | — | — | — | 1.5 | — | — | — |
| 1,12-dodecane diamine | — | — | — | — | — | — | 1 | — | — |
| 3,4-diamino diphenylamine | — | — | — | — | — | — | — | 1.5 | — |
| Calcium oxide | 1 | 1 | 1 | 1 | 1 | 1 | 1 | 1 | 1 |
| i) Viscosity change rate (%) | | | | | | | | | |
| after 3 days | +5 | +5 | +5 | +5 | +5 | +50 | −4 | −5 | −5 |
| after 7 days | +15 | +15 | +15 | +10 | +15 | Cured | Cured | +1 | −10 |
| after 14 days | +25 | +25 | +25 | +20 | +30 | — | — | Cured | −10 |
| ii) Low temperature baking property | ◯ | ◯ | ◯ | ◯ | ◯ | x | x | x | x |
| iii) Low-temperature flexibility | ◯ | ◯ | ◯ | ◯ | x | — | — | — | ◯ |

(*1) "F345" available from Zeon Kasei Co., Ltd.
(*2) "PSH180" available from Kaneka Corporation
(*3) "Fujicure FXE-1000" (polyamine modified compound: Type (A)) available from Fuji Kasei Kogyo Co., Ltd.
(*4) "Adeka bardener H37315" (other polyamine modified compound: Type (B)) available from Asahi Denka Co., Ltd.
(*5) "Jefermine T-403" available from Daito Sangyo Co., Ltd.

INDUSTRIAL APPLICABILITY

The plastisol composition according to the present invention is sufficiently adhesive to a paint plate or an electrodeposition-coated surface, and is particularly useful as a body sealer used in automotive assembly line. Further, the inventive composition can be used as an undercoating material for an automobile, and also as a coating material or an adhesive for other metal material, etc.

The invention claimed is:

1. A plastisol composition which comprises an acrylic plastisol consisting of a plasticizer having acrylic resin particles and a filler dispersed therein and therewith formulated a blocked urethane prepolymer wherein free isocyanate groups of a terminal isocyanate containing urethane prepolymer have been blocked or a blocked polyisocyanate compound and a latent curing agent which is particulate solid at normal temperature, has a melt point of 60° C. or higher, and is insoluble in the plasticizer at 40° C. or lower, wherein said latent curing agent is at least one of
   a reaction product of an aliphatic polyamine and a cyclic amine or aromatic polyamine having at least one $NH_2$ or NH group and a diisocyanate compound, and
   those obtained by allowing an addition reaction product of an epoxy compound and one or more selected from the group consisting of aliphatic polyamines, cyclic amines and aromatic polyamines to react with a phenol compound and/or a polycarboxylic acid compound to mask the amino group to be inactive.

2. The plastisol composition according to claim 1, wherein the ratio by weight of said acrylic resin particle to said blocked urethane prepolymer or blocked polyisocyanate compound is 20/1 to 1/20.

3. The plastisol composition according claim 1, wherein said latent curing agent is present at an amount of from 1 to 50 parts by weight to 100 parts by weight of said blocked urethane prepolymer or blocked polyisocyanate compound.

* * * * *